Oct. 27, 1964 D. B. STOLTZFUS 3,154,054
FEEDER
Filed Oct. 25, 1963 3 Sheets-Sheet 1
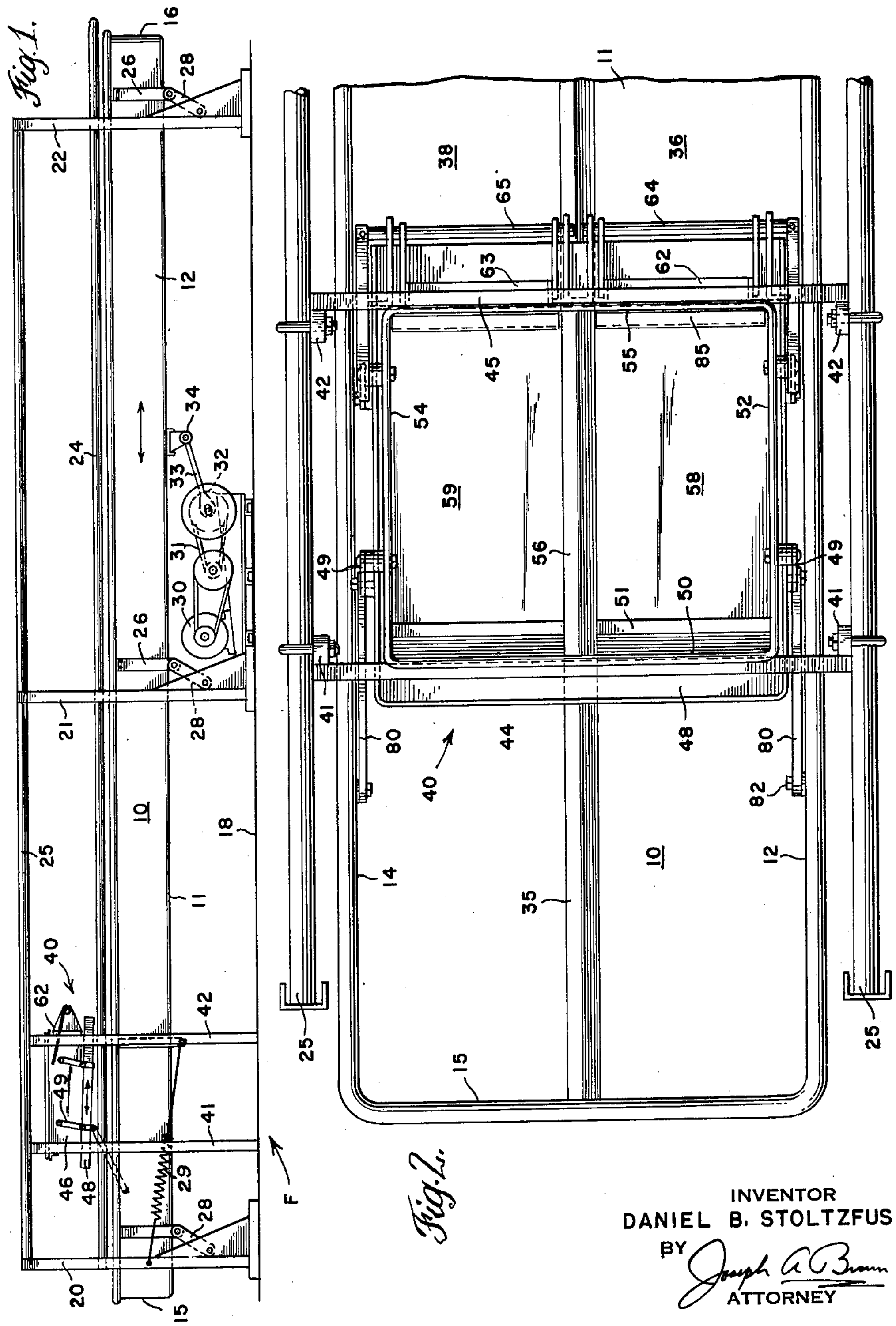

Oct. 27, 1964 D. B. STOLTZFUS 3,154,054
FEEDER
Filed Oct. 25, 1963 3 Sheets-Sheet 2
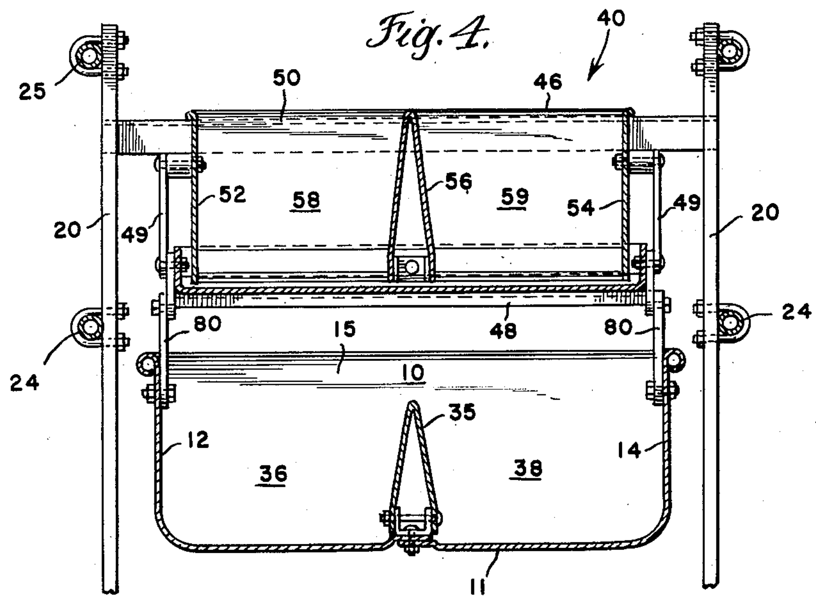
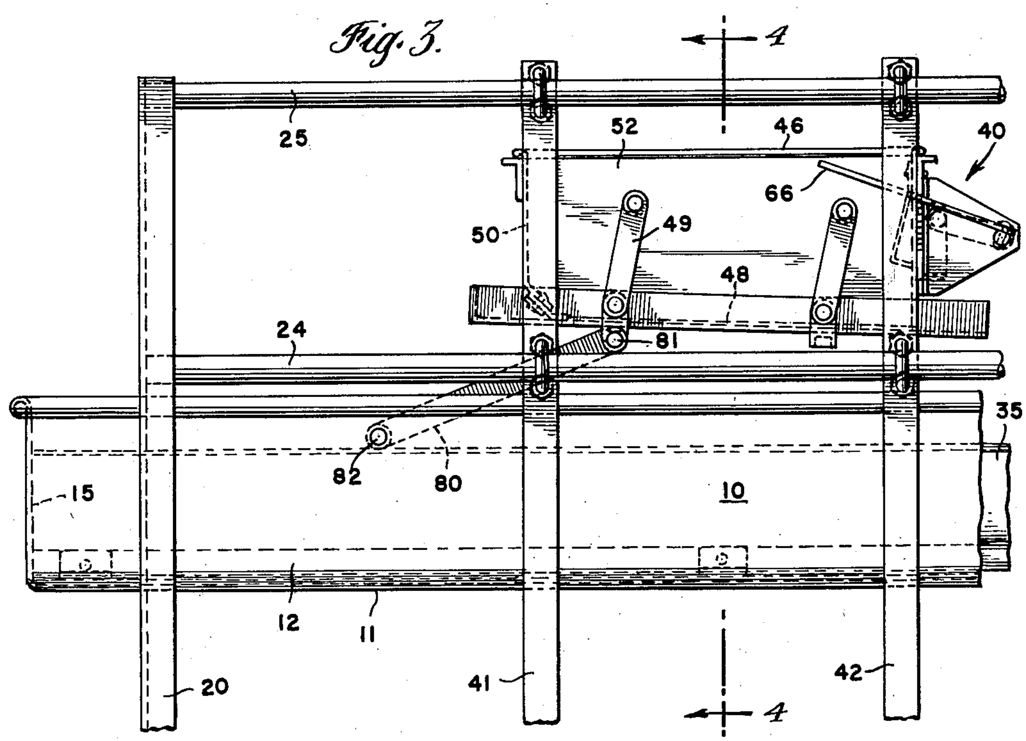
INVENTOR
DANIEL B. STOLTZFUS
BY Joseph A. Brown
ATTORNEY Oct. 27, 1964 D. B. STOLTZFUS 3,154,054
FEEDER
Filed Oct. 25, 1963 3 Sheets-Sheet 3
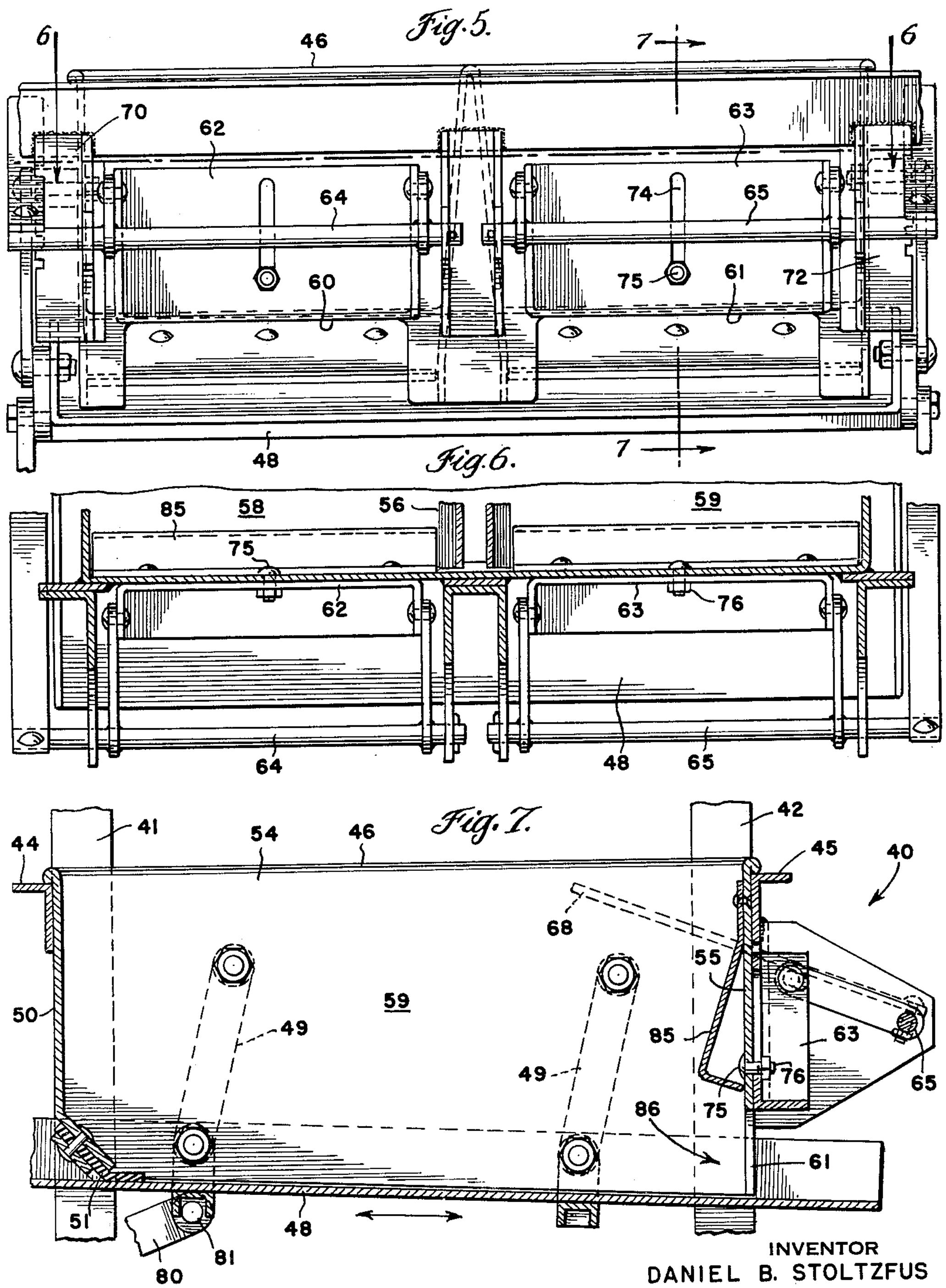
INVENTOR
DANIEL B. STOLTZFUS
BY Joseph A. Brown
ATTORNEY United States Patent Office 3,154,054

Patented Oct. 27, 1964

3,154,054

FEEDER

Daniel B. Stoltzfus, Kinzer, Pa., assignor to Sperry Rand Corporation, New Holland, Pa., a corporation of Delaware Filed Oct. 25, 1963, Ser. No. 318,962

8 Claims. (Cl. 119—53)

This invention relates generally to devices for delivering feed to stock animals. More particularly, the invention relates to improvements in the stock feeder disclosed in U.S. Patent No. 3,092,077.

In certain feed lot arrangements, two stock yards are provided in side by side relation. The stock animals in one yard may be different in type and/or age from the animals in the next yard. To facilitate delivering feed to both yards, it is common to provide an elongated feeding station which forms the dividing line between the yards. One group of animals feed from one side of the station and the other animals feed from the opposite side.

One object of this invention is to provide an elongated stock feeder which may be readily used to deliver a given quantity of feed to animals along one side a feeding station and to simultaneously deliver a different quantity of feed to animals at the opposite side.

Another object of this invention is to provide a stock feeder of the character described wherein the means which delivers the feed and the trough from which the animals feed is one in the same, the animals at each side of the trough being given access to only that half of the trough adjacent to them and being restricted from obtaining feed from the remote half.

Another object of this invention is to provide a stock feeder of the character described wherein independently operable control means is provided whereby feed deposited in one longitudinal side of a feed trough may be different in quantity from feed deposited in the opposite side of the trough.

A further object of this invention is to provide a stock feeder of the character described which is easily fabricated and assembled.

A still further object of this invention is to provide a stock feeder which is low in cost and more versatile than other stock feeders.

Other objects of this invention will be apparent hereinafter from the specification and from the recital in the appended claims.

In the drawings:

FIG. 1 is a side elevation of a stock feeder constructed according to this invention;

FIG. 2 is an enlarged fragmentary plan view of the left end of the feeder and showing the metering device forming part of the apparatus;

FIG. 3 is a side elevational view of FIG. 2;

FIG. 4 is a transverse vertical section taken on the line 4—4 of FIG. 3 looking in the direction of the arrows;

FIG. 5 is an enlarged front view of the metering device looking from right to left at the upper end of FIG. 3;

FIG. 6 is a fragmentary section taken on the line 6—6 of FIG. 5 looking in the direction of the arrows; and FIG. 7 is a longitudinal vertical section taken on the line 7—7 of FIG. 5 looking in the direction of the arrows.

Referring now to the drawings by numerals of reference, and paricularly to FIGS. 1–4, F denotes generally a stock feeder comprising an elongated horizontally extending trough 10 having a bottom wall 11 and laterally spaced side walls 12 and 14 projecting upwardly from the bottom wall. One end of trough 10 is closed by a transverse wall 15 and the opposite trough end is closed by a wall 16.

For supporting trough 10 for reciprocal movement in its entirety relative to the ground 18, frame supports 20, 21 and 22 are provided. These supports are spaced relative to each other and they are interconnected by a lower set of rails 24 and an upper set of rails 25. The lower rails are located above the top of trough 10 and outwardly thereof (FIG. 4) and the rails 25 are aligned with and substantially spaced vertically from the lower rails to provide an access space to the trough. Adjacent each support, trough 10 seats in a U-shaped bracket 26 to which a pair of links 28 are pivotally connected. The opposite ends of the links are pivotally connected to the supports, as shown, so that trough 10 may be reciprocated longitudinally. Tension spring means 29 is connected between trough 10 and support 20 to hold the trough generally in the position shown in FIG. 1. The spring means yieldably resists pivoting of the links 28 in a clockwise direction.

For longitudinally oscillating trough 10 so that feed deposited in the trough adjacent end 15 is vibrated and conveyed toward end 16, a motor 30 is provided beneath the trough and resting on the ground 18. Motor 30 is connected by a drive 31 to an eccentric 32 which reciprocates a rod 33 pivotally connected at 34 to the underside of trough 10. When motor 30 is operated, rod 33 is reciprocated and trough 10 in its entirety is vibrated to convey feed from left to right in FIG. 1.

Animals may feed from trough 10 by extending their heads through the space between the rails 24 and 25. Access to the trough may be had over the side wall 12 and also over the side wall 14. As shown best in FIGS. 2 and 4, trough 10 has an upstanding longitudinal center wall 35 which divides trough 10 into a first longitudinal section 36 adjacent wall 12 and a second longitudinal section 38 adjacent wall 14. The rail 24 adjacent wall 12 allows a steer or other animal along that side of the trough to feed from section 36 but prevents access to trough section 38. In like respect, the rail 24 adjacent side wall 14 allows free access to trough section 38 but restricts animal access to trough section 36. Feed deposited in trough 10 adjacent side wall 15 and in sections 36 and 38 remains in the respective sections and is conveyed therein toward wall 16.

For controlling the deposit of feed in trough 10, a metering device 40 is provided above and in vertical register with the end of the trough adjacent wall 15. Metering device 40 is supported on spaced vertical support members 41 and 42 and transverse braces 44 and 45. The device comprises a fixedly mounted hopper 46 having a movable bottom 48. Bottom 48 is supported on links 49 pivotally carried on the hopper, the pivots of the links being on transverse axes whereby the hopper bottom may be reciprocated in a direction parallel to the reciprocation of trough 10. The hopper has a rear wall 50 and connected to the lower end thereof, as shown in FIG. 7, is a rubber seal strip 51 which slidably abuts against hopper bottom 48 and closes off the hopper against the escape of feed in the direction toward trough end 15.

Hopper 46 of metering device 40 also has spaced side walls 52 and 54 and a vertical front wall 55. Carried on rear wall 50 and front wall 55 and extending coplanar with wall 35 of trough 10 is a vertical medial divider wall 56, shown best in FIGS. 2 and 4. Wall 56 divides the hopper into a first compartment 58 in vertical register with first section 36 of trough 10 and a second compartment 59 in vertical register with second trough section 38.

In the lower end of front wall 55 outlets 60 and 61 are provided through which feed material is adapted to be discharged from compartments 58 and 59, respectively. Outlet 60 is opened and closed by a gate 62 and outlet 61 by a gate 63. The gates 62 and 63 are vertically movable along the outside of hopper wall 55, being carried respectively on rock shafts 64 and 65. Rock shaft 64 is rotated by means of a handle 66 and shaft 65 by a handle 68. Referring to FIG. 7, when the handle 68 is swung downwardly, rock shaft 65 is rotated in a counterclockwise direction and gate 63 is lowered. In like respect, similar movement of handle 66 will rotate rock shaft 64 to lower the gate 62. The adjustment of one gate is wholly independent of the adjustment of the other gate. The gates may be positioned in the opened locations, as shown, or completely closed, or at any intermediate point. To lock the gates in adjusted position, handle 66 is engageable with a notched plate 70 and handle 68 is engageable with a notched plate 72.

For guiding gates 62 and 63 in their adjustable movements, each gate is provided with a vertical slot 74 which provides a guide track and hopper wall 55 has a bolt 75 projecting through each slot. The nut 76 on each bolt is not threaded to a tight position to allow free but guided gate movement.

To reciprocate the bottom 48 of hopper 46, a pair of links 80 are provided, one end of each link being pivotally connected at 81 to bottom 48 adjacent a rearward end thereof and the opposite end of each link being pivotally connected at 82 to trough 10. Thus, when trough 10 is vibrated by motor 30 to convey feed, the bottom 48 of the metering device is simultaneously reciprocated to cause feed material in hopper 46 to be discharge through the outlets 60 and 61. To control and provide a uniform outflow of feed, a downwardly and inwardly inclined deflector 85 is fastened to hopper front wall 55 (FIG. 7). Deflector 85 forms a passage 86 through which the feed flows toward the hopper outlets.

With the stock feeder described, the animals feeding from trough 10 along side wall 12 have access only to the feed in trough section 36. The animals at the opposite side 14 of the trough have access only to trough section 38. By adjusting the size of outlets 60 and 61 using gates 62 and 63, the volume of feed discharged from hopper compartment 58 to trough section 36 may be different from the quantity of feed discharged from compartment 59 to trough section 38. Therefore, the animals at one side of the feeder may be provided with an amount of feed greater or smaller than the amount of feed provided for the animals at the opposite side. Further, even though the quantity of feed supplied to one trough section may be different from the other, both sections may receive their feed at the same time and it is simultaneously conveyed. Likewise, one of the hopper outlets can be completely closed and the other opened. In such case one side of trough 10 will receive feed and the other side none.

The structure described is simple and inexpensive. Nevertheless, great versatility in operation and use is available.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A stock feeder comprising, in combination, an elongated generally horizontally extending trough having a bottom wall and a pair of spaced longitudinal side walls projecting upwardly from said bottom wall, an upright center wall in said trough between said side walls and coextensive therewith, said center wall dividing the trough into a first section and a second section extending longitudinally and access to which may be had over the respective side walls, a feed metering hopper above said trough adjacent one end thereof and in vertical register therewith, said hopper comprising a fixedly mounted body and a bottom reciprocal relative thereto, said body having an upright wall substantially coplanar with said trough center wall and dividing the hopper into first and second compartments, said first compartment having an outlet which discharges feed to said first trough section, said second compartment having an outlet which discharges feed to said second trough section, a pair of gates one of which regulates the size of the outlet from said first compartment and the other of which regulates the size of the outlet from said second compartment, means mounting said gates for movement relative to said hopper body, said gates being adjustable independently whereby the volume of feed discharged into said first trough section may be different from the volume of feed discharged into said second trough section, means supporting said trough for longitudinal reciprocation in its entirety whereby feed deposited in said one end of the trough and in said sections is vibrated and conveyed toward the opposite end of the trough, link means connecting said trough to said hopper bottom so that the hopper bottom is reciprocated with the trough to move feed from the hopper and through said outlets, and power means for reciprocating said trough.

2. A stock feeder as recited in claim 1 wherein seal means is provided between said hopper body and the hopper bottom to prevent feed from escaping from the hopper body except through said outlets.

3. A stock feeder as recited in claim 1 wherein said compartment outlets are located on the side of the hopper body facing said opposite end of said trough, said gates extending transversely and being movable in vertical planes to open and close said outlets.

4. A stock feeder as recited in claim 3 wherein said gates have guide tracks and said hopper body guide members cooperative therewith to control the movement of the gates.

5. A stock feeder as recited in claim 3 wherein each gate is supported on a transverse rock shaft, a handle being provided and connected to the rock shaft whereby when the shaft is rotated in one direction the associated gate is lowered and when the shaft is rotated in an opposite direction the gate is raised.

6. A stock feeder as recited in claim 4 wherein each handle has an associated latch having plural latching locations with which the handle is selectively engageable to lock the handle in plural adjusted positions.

7. A stock feeder comprising, in combination, an elongated generally horizontally extending trough having a bottom wall and a pair of spaced longitudinal side walls projecting upwardly from the bottom wall, an upright center wall in said trough between said side walls and coextensive therewith, said center wall dividing the trough into a first section and a second section extending longitudinally and access to which may be had over the respective side walls, a feed metering hopper supported above said trough adjacent one end thereof and in vertical register therewith, said hopper having a pair of outlets one of which discharges material into said first trough section and the other of which discharges material into said second trough section, means operatively associated with said hopper for regulating the rate of discharge of material from said outlets whereby the volume of feed discharged into said first section may be different from the volume of feed discharged into said second section, means supporting said trough for longitudinal reciprocation in its entirety whereby feed deposited in said one end of the trough and in said sections is vibrated and conveyed toward the opposite end of the trough, and power means for reciprocating said trough.

8. A stock feeder comprising, in combination, an elongated generally horizontally extending trough having a bottom wall and a pair of spaced longitudinal side walls projecting upwardly from the bottom wall, an upright center wall in said trough between said side walls and extending generally parallel thereto, said center wall dividing the trough into a first section access to which may be had over one side wall and into a second section access to which may be had over the other side wall, means supporting said trough for longitudinal reciprocation in its entirety whereby feed deposited in one end of the trough is vibrated and conveyed toward the opposite end, means for reciprocating said trough, and metering means for depositing feed in said trough and on opposite sides of said center wall, said metering means including a pair of discharge control elements, whereby the feed deposited in said first section may be different in quantity from the feed deposited in said second section.

References Cited by the Examiner

UNITED STATES PATENTS

| | | | |
|---|---|---|---|
| 2,289,942 | 7/42 | Tafel | 198—220 |
| 2,745,539 | 5/56 | Hazen | 119—52X |

SAMUEL KOREN, *Primary Examiner.*

HUGH R. CHAMBLEE, *Examiner.*